Aug. 25, 1925.
C. H. LYNE
1,551,258
PROCESS AND APPARATUS FOR MOLDING CYLINDRICAL OBJECTS
Filed Aug. 14, 1924   2 Sheets-Sheet 1
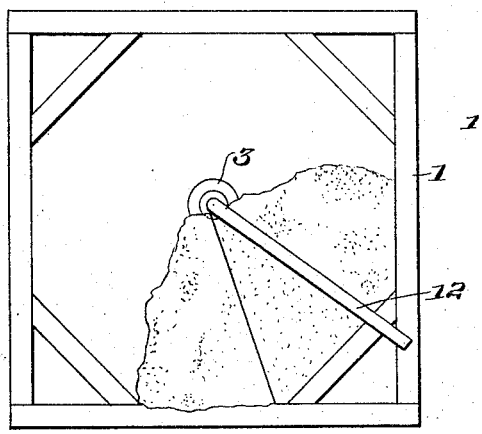
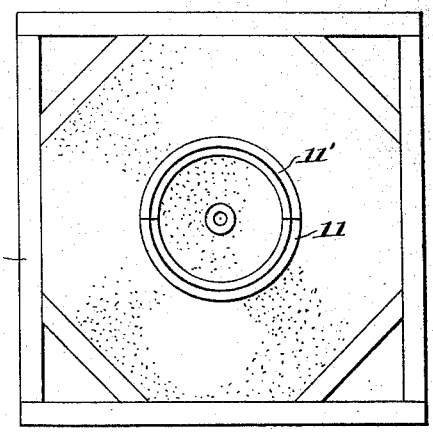
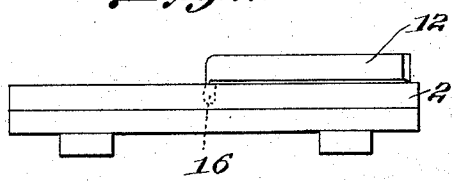
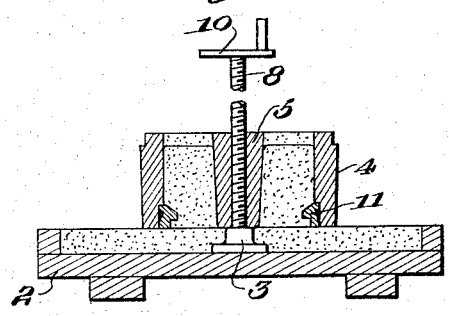
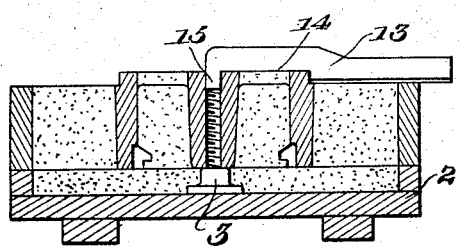
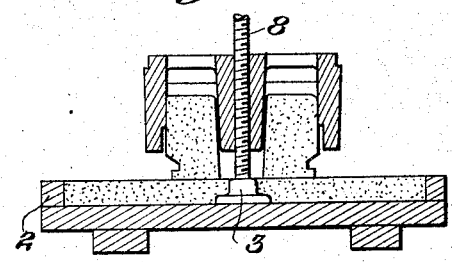
Inventor
C. H. Lyne
By Mason Fenwick & Lawrence
Attorneys

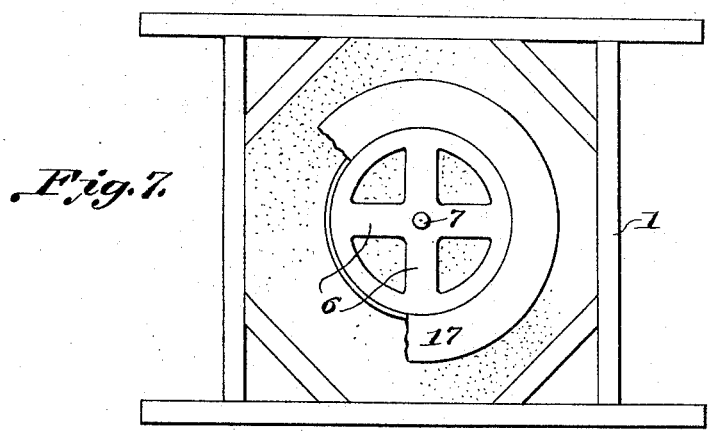
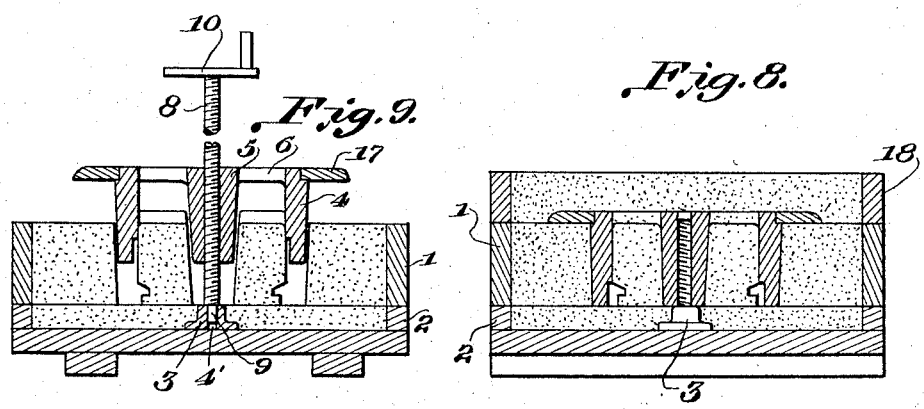
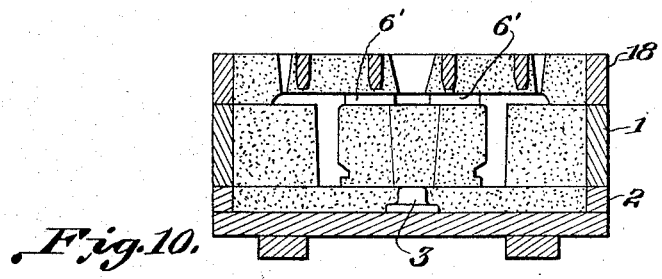

Patented Aug. 25, 1925.

1,551,258

UNITED STATES PATENT OFFICE.

CHARLES H. LYNE, OF MIAMI, FLORIDA.

PROCESS AND APPARATUS FOR MOLDING CYLINDRICAL OBJECTS.

Application filed August 14, 1924. Serial No. 732,092.

*To all whom it may concern:*

Be it known that I, CHARLES H. LYNE, a citizen of the United States, residing at Miami, in the county of Dade and State of Florida, have invented certain new and useful Improvements in Processes and Apparatus for Molding Cylindrical Objects; and I do hereby declare the following to be a full, clear, and exact description of the invention, such as will enable others skilled in the art to which it appertains to make and use the same.

This invention relates to an improved process and apparatus for molding cylindrical objects. The object of the present invention is to provide a process and apparatus for preparing a mold for cylindrical objects, such as manhole patterns and the like, by means of which one man can efficiently handle a pattern and by means of which a green sand core or a baked core is eliminated, as well as the necessity of having to roll over the mold permitting the use of true turned patterns.

The invention consists in the novel process and apparatus whose construction, arrangement and combination of parts is hereinafter more fully described and claimed.

Two sheets of drawings accompany this specification as part thereof in which like reference characters indicate like parts throughout.

Fig. 1 is a plan view of the bottom board of the drag, illustrating the first step in the improved process.

Fig. 2 is a front elevation of Fig. 1.

Fig. 3 is a plan view similar to Fig. 1 showing the second step in the process.

Fig. 4 is a vertical transverse section illustrative of the third step in the process.

Fig. 5 is a vertical transverse section illustrating the fourth step in the process.

Fig. 6 is a vertical transverse section illustrating the fifth step in the process.

Fig. 7 is a plan view of the drag showing the sixth step in the process.

Fig. 8 is a vertical transverse section of the drag and cope illustrating the seventh step in the process.

Fig. 9 is a vertical transverse section of the drag with the cope removed illustrating the eighth step in the process; and Fig. 10 is a vertical transverse section of the drag and cope assembled preliminary to casting.

With a view to clearness the present invention has been illustrated in the drawings in connection with the apparatus and process applied to preparing a mold for the casting of a manhole, but the invention is equally applicable to the casting of other cylindrical or irregularly shaped bodies, as will be readily perceived.

The apparatus, which is quite simple, will be described in connection with the description of the process, hereinafter.

In accordance with the present invention the drag is constructed in two parts, the bottom section 2 having a relatively shallow marginal wall, and the upper section 1 having neither top nor bottom but only walls adapted to coincide with the marginal walls of the bottom part 2.

On the upper face of the bottom part 2 of the drag is positioned a bearing socket 3, the upper face of which is of substantially the same height from the face of the bottom as the marginal walls.

The first step in the process consists in filling the bottom part 2 of the drag with sand and packing the same therein, whereupon a scraper 12 having an offset pivot 16 at one end and a straight lower edge is positioned with its pivot 16 in the socket 4' of socket plate 3 and swung in a circle over the lower section 2 of the drag, thus forming a smooth upper face on the packed sand therein, as is well illustrated in Figs. 1 and 2.

The next step in the process is the placing of semicircular ring patterns 11, 11', designed to form an inwardly directed flange on manhole in position upon the top of the packed sand in the drag part 2 as is illustrated in Fig. 3.

The main cylindrical pattern 4 is provided with a supplementary part 5 of substantially the same depth as that of the pattern secured to the main pattern as by spider arms 6 and provided with a vertical internally threaded orifice 7 adapted to receive a screw member 8 having on one end a pivot pin 9 and upon its other end a hand wheel 10. The screw 8 is adapted to comate with the threaded orifice 7 in part 5 and its pivot 9 is adapted to engage in the socket 4' of socket plate 3.

The next step in the process is the positioning of the main cylindrical pattern 4 over the sand in the lower drag part 2 with the screw 8 in threaded engagement with the orifice 7 and the pivot 9 in engagement with the socket 4' of the socket plate 3 as is illustrated in Fig. 4, in which position it will be noted that the semicircular ring patterns 11, 11' engage the inner face of the cylindrical pattern 4 or a suitable groove provided therein, if so desired, as is illustrated.

The next step is to fill the cylindrical pattern with sand as is illustrated in Fig. 4.

At this point it will be noted that the supplementary part 5 of pattern 4, being of the same depth as the pattern the screw 8 is protected from the sand throughout.

The next step in the process is the raising of the pattern 4 by means of rotation of screw 8 by hand wheel 10, leaving the sand core formed within pattern 4 in position, and thus permitting the removal of the semicircular ring patterns 11, 11' as illustrated in Fig. 6.

The semicircular ring patterns having been removed, the cylindrical pattern 4 is again lowered upon the sand in the lower drag section 2 and the intermediate drag part 1 is placed in position over the bottom drag part 2 and filled with sand around pattern 4, as is illustrated in Fig. 6.

A modified form of scraper 13 having a pivot 15 and an indentation 14 is then positioned with its pivot 15 in the threaded orifice 7 as shown in Fig. 6 and swung circularly over the drag, thus removing the surplus sand and leaving a smooth face, both to the sand within the pattern and that between the pattern and the drag.

The ring pattern 17 constituting the pattern for the main external flange of the manhole is then placed about the cylindrical pattern 4 and upon the upper face of the sand within the drag, as is illustrated in Fig. 7, and having made a parting the cope 18 is placed in position, as is illustrated in Fig. 8. The screw 8 is then removed and a suitable stopper inserted in the orifice 7, after which the cope is packed with sand as is the usual practice.

After the cope has been packed it is removed, the screw 8 reinserted, and the pattern 4 with ring pattern 17 lifted from the drag as illustrated in Fig. 9. The orifice left in the core by the part 5 may then be filled with sand.

The cope 18 is then replaced and the mold is ready for the casting operation.

The orifices in the cope made by the spider arms 6 by which the central threaded part 5 is held to the pattern 4 constitute gates for the metal. Obviously the part 5 having the vertical threaded orifice may be located as desired and as suited to the particular casting to be made, having in mind the center of gravity of the pattern being used.

Having thus described my invention, I claim:

1. An improved apparatus for casting comprising a drag having a bottom section and a top section, a pivot socket secured upon the inner face of the bottom section of the drag, a pattern having a part provided with a vertical internally threaded orifice, a screw adapted to co-mate with the threaded orifice of the pattern and having at one end a pivot adapted to seat in a pivot socket and means for rotating the screw.

2. A mold comprising a base, a frame removably mounted on the base, a pattern adapted to be arranged within the frame, a vertically arranged threaded element carried by the pattern, and a threaded stem engaged with the threaded element and adapted to bear against the base so that upon rotation of the stem in one direction the pattern will be moved vertically to leave its outline in sand, which normally fills the frame and entirely surrounds the pattern.

3. A mold comprising a drag which includes a bottom section and an upper removable section, both of which being adapted to retain a silicate filler, a pattern submerged in the filler, a vertically arranged interiorly threaded element carried by the pattern, a manually operable threaded stem engaged with the threaded element whereby to raise the pattern from the drag to leave the outline of the latter in the filler.

4. A mold comprising a drag adapted to receive a filler, a vertically movable pattern adapted to be submerged in the filler, means for moving the pattern in a vertical direction, a removable flange forming part of the pattern and adapted to be positioned upon the upper end thereof, and a parting cope adapted to be positioned upon the drag and receive a filler which surrounds the flange, the filler in the parting cope being formed with inlet openings to permit metal to be poured into the outline of the pattern after the same has been moved vertically away from the drag.

In testimony whereof I affix my signature.

CHARLES H. LYNE.